(No Model.)
H. W. LEONARD.
ELECTRICAL INDICATOR.
No. 430,865. Patented June 24, 1890.
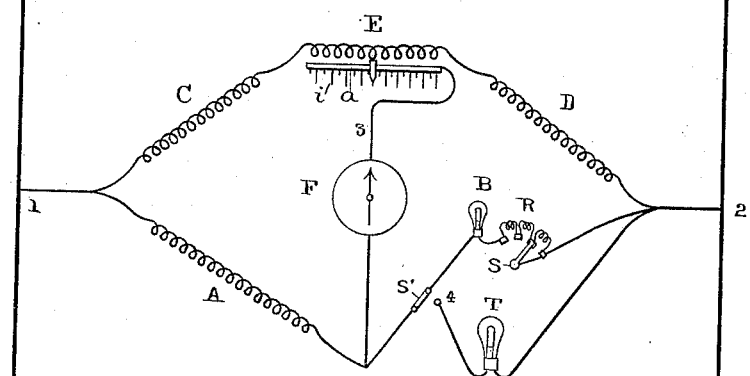
Witnesses
Norris S. Clark
Charles M. Cattin.
Inventor
H. W. Leonard,
By his Attorneys,
Dyer & Seely,

UNITED STATES PATENT OFFICE.

HARRY WARD LEONARD, OF NEW YORK, N. Y.

ELECTRICAL INDICATOR.

SPECIFICATION forming part of Letters Patent No. 430,865, dated June 24, 1890.

Application filed March 24, 1890. Serial No. 345,101. (No model.)

*To all whom it may concern:*

Be it known that I, HARRY WARD LEONARD, a citizen of the United States, residing at New York city, in the county and State of New York, have invented a new and useful Improvement in Electrical Indicators, of which the following is a specification.

This invention relates especially to that class of instruments used for indicating changes in electro-motive force or for measuring the same, and is intended for use in systems of electric lighting, &c., to indicate variations in electro-motive force or to test a circuit at any point.

In the accompanying drawing, which is a diagram of the circuits and instruments, my improvement is shown embodied in the electrical indicator of J. W. Howell, but it may be applied to other instruments, as will clearly appear hereinafter.

In the drawing, 1 2 are the points of the electric circuit, the electro-motive force or difference of potential of which is to be indicated or tested. The parts of the instrument form a Wheatstone bridge connected between said points. In one side of the bridge are a resistance A and an incandescent electric lamp B. In the other side are a resistance C and a resistance D, and between these two a resistance E. The galvanometer F is in the bridge 3, between the two sides. One of its terminals is connected with contact $a$, which is movable along the coils of the resistance E.

The apparatus thus far described is old. In the use of said apparatus it has been found that the normal resistance of lamp B slowly undergoes a change, owing to the changes in the structure of the filament caused by continued or repeated passing of current through the same or by defects in the filament. For this reason the indication given is not always correct. For example, if the resistance of lamp B is greater than its normal resistance the galvanometer-needle might stand at zero and still the electro-motive force on the line be different from that indicated. I have provided means for determining whether the conductivity of the resistance-lamp has varied, and if it has for compensating for such change. One form of said means consists in a resistance R, in series with the resistance-lamp B, a switch S, which shunts more or less of the resistance, as desired, a branch around lamp B and resistance R, normally open and containing a standard lamp T, or equivalent standard resistance, and switch S', so placed that it may be moved to open the normal circuit and close the branch circuit. It is evident that the location of adjustable resistance R may be changed without departing from my invention.

When the apparatus is made, the scale is laid off empirically to indicate volts—i. e., when contact $a$ is at any point of resistance E and the galvanometer-needle is at zero, the scale will indicate the electro-motive force on the line tested. When a test is made and the electro-motive force in the circuit is found to vary from the electro-motive force desired, said variation is indicated upon the galvanometer scale. When the galvanometer is deflected, resistance E is regulated so as to bring it back to zero, and the amount of such regulation indicated upon the scale $i$ shows what the amount of variation of the electro-motive force has been. The lamp B is subjected to frequent use, and from various causes the filament may vary in resistance. For this reason, at intervals it is desirable to determine whether the resistance has changed or not. To do this I move the switch S' onto the contact 4, and the deflection of the galvanometer-needle, if any, is noted. The switch is then moved back to the position shown in the drawing, and if the galvanometer-needle moves to the same point it shows that the resistance B is correct. If the needle does not move to the same point, the switch S is adjusted to cut in more or less of resistance R until the galvanometer-needle is brought to said point. In this condition the resistance of the lamp B, plus the resistance between the lamp and switch S, will be equal to the resistance of lamp T. Since the latter lamp is used only momentarily and at comparatively long intervals, its resistance will remain practically constant, and it may be used as a standard for an indefinite time.

The apparatus which I have described is simply illustrative of my invention, and I do not confine myself to this form of indicator, since it is evident that the calibrating device is applicable to other forms of apparatus. Instead of varying a resistance in series with one of the lamps, a change in the connections of the resistances composing the bridge, as the standard or working resistance is in circuit, might be used.

While the main resistance B and the standard resistance T have been described as lamps, the means for calibrating are applicable in any arrangement in which the resistance corresponding to B is variable—that is, is subject to accidental or incidental changes, and in which the standard resistance remains constant, whether the resistances are in the form of lamps or other devices.

Having thus described my invention, what I claim is—

1. In an electrical indicator, the combination of a lamp in a closed circuit, an adjustable resistance in series therewith, a standard lamp in a normally-open branch around the first-mentioned lamp and resistance, a switch for opening the normal circuit and closing the open branch, and means for comparing the resistances of the two circuits or branches, substantially as described.

2. The combination, with a current-indicator, the circuits of the indicator being normally balanced and one branch containing a varying resistance, and an independent adjustable resistance in series therewith, of a standard resistance in a normally-open branch around said varying resistance and adjustable resistance, and a switch for opening the normally-closed circuit and closing the branch, whereby the varying resistance may be tested, substantially as described.

3. The combination, with a current-indicator, the circuits of the indicator being normally balanced and one branch containing a varying resistance, and the independent resistances in series therewith, a switch for throwing more or less of said resistance into circuit, of a constant standard resistance in a normally-open branch around said varying resistance and adjustable resistance, and a switch for opening the closed circuit and closing the open branch, whereby the variable-resistance branch may be tested and the resistance adjusted, substantially as described.

4. The combination, with a current-indicator, the circuits of which are normally balanced and one branch containing a varying resistance, of a constant standard resistance normally out of circuit, means for changing the circuit from one resistance to the other, and means for restoring the balance, substantially as described.

5. The combination, with a current-indicator, the circuits of which are normally balanced, and one branch normally in circuit containing a varying resistance, of a constant standard resistance, means for substituting one of said resistances for the other, a common scale for use with either resistance, and means for adjustment, substantially as described.

6. The method of calibrating an instrument using a resistance subject to variations, which consists in substituting therefor a standard resistance and noting the effect produced in the circuit, replacing the original resistance and adding or subtracting resistance until the circuit is restored to the condition noted when the standard resistance was inserted, substantially as described.

7. The method of calibrating an instrument using a varying resistance, which consists in substituting therefor a standard resistance and noting the indication of the instrument, replacing the original resistance, and varying the connections to produce the same indication as noted, substantially as described.

This specification signed and witnessed this 12th day of March, 1890.

HARRY WARD LEONARD.

Witnesses:
S. D. GREENE,
C. G. DRUM.